(12) United States Patent
Castex (10) Patent No.: US 11,160,357 B2
(45) Date of Patent: Nov. 2, 2021

(54) COSMETIC PRODUCT APPLICATOR

(71) Applicant: Chanel Parfums Beauté, Neuilly-sur-Seine (FR)

(72) Inventor: Nicolas Castex, Colombes (FR)

(73) Assignee: Chanel Parfums Beauté

( * ) Notice: Subject to any disclaimer, the term of this patent is extended or adjusted under 35 U.S.C. 154(b) by 200 days.

(21) Appl. No.: 16/083,918

(22) PCT Filed: Mar. 7, 2017

(86) PCT No.: PCT/FR2017/050500
§ 371 (c)(1),
(2) Date: Sep. 11, 2018

(87) PCT Pub. No.: WO2017/153673
PCT Pub. Date: Sep. 14, 2017

(65) Prior Publication Data
US 2019/0090622 A1 Mar. 28, 2019

(30) Foreign Application Priority Data
Mar. 11, 2016 (FR) ...................................... 1652039

(51) Int. Cl.
| | | |
|---|---|---|
| *A45D 40/26* | (2006.01) | |
| *A46B 9/02* | (2006.01) | |
| *B33Y 50/02* | (2015.01) | |
| *B33Y 80/00* | (2015.01) | |
| *B33Y 10/00* | (2015.01) | |

(52) U.S. Cl.
CPC .............. *A46B 9/021* (2013.01); *A45D 40/26* (2013.01); *A46B 9/028* (2013.01); *B33Y 50/02* (2014.12); *B33Y 80/00* (2014.12); *A46B 2200/1053* (2013.01); *B33Y 10/00* (2014.12)

(58) Field of Classification Search
CPC .......... A45D 34/042–047; A45D 40/26; A45D 40/262; A45D 40/264; A45D 40/265; A45D 40/267; A46B 9/021; A46B 2200/1053; A46B 2200/1046; A46B 2200/106
USPC ............. 132/218, 320; 15/207.2; D28/7, 36; D4/128
See application file for complete search history.

(56) References Cited

U.S. PATENT DOCUMENTS

| | | | |
|---|---|---|---|
| 4,422,986 A * | 12/1983 | Cole ...................... | A46B 3/005 15/187 |
| 2006/0272668 A1* | 12/2006 | Wyatt ..................... | A45D 34/04 132/218 |
| 2006/0279181 A1* | 12/2006 | Gueret ................. | A45D 40/262 312/218 |
| 2009/0056737 A1 | 3/2009 | Neuner et al. | |

(Continued)

FOREIGN PATENT DOCUMENTS

| | | | | |
|---|---|---|---|---|
| FR | 2744608 A1 | 8/1997 | | |
| FR | 2993441 A1 * | 1/2014 | ............... | A46B 1/00 |

(Continued)

*Primary Examiner* — Rachel R Steitz
(74) *Attorney, Agent, or Firm* — St. Onges Steward Johnson & Reens LLC (57) ABSTRACT

The invention relates to an applicator for a cosmetic product, having a proximal end and a free end, and having at least two rows of fingers forming a first and a second planar layer respectively. The two layers are separate and parallel to one another. One dimension of the fingers decreases along the applicator from the proximal end to the free end.

18 Claims, 4 Drawing Sheets

(56) References Cited

U.S. PATENT DOCUMENTS

2011/0168204 A1\* 7/2011 Gueret .................. A46B 9/021
                                                                132/218
2013/0000663 A1    1/2013 Jacob et al.

FOREIGN PATENT DOCUMENTS

| JP | 2009291344 A   | \* | 12/2009 | ............. A46B 9/021 |
| WO | 2008113939 A2  |    | 9/2008  |   |
| WO | 2010007588 A2  |    | 1/2010  |   |
| WO | WO-2010007588 A2 | \* | 1/2010  | ........... A45D 40/265 |
| WO | 2013153528 A1  |    | 10/2013 |   |
| WO | WO-2015110853 A1 | \* | 7/2015  | ........... A46D 1/0253 |
| WO | 2015124481 A1  |    | 8/2018  |   |

\* cited by examiner

COSMETIC PRODUCT APPLICATOR

FIELD OF THE INVENTION

The invention relates to cosmetic product applicators.

BACKGROUND OF THE INVENTION

A mascara article, or "mascara", typically comprises a case, a mascara container and an applicator. There are two types of applicator, bottle brush type and injected type. A bottle brush type applicator forms a brush which comprises bristles formed by fibers trapped in a twisted metal wire forming the core of the applicator. An injected applicator is a single piece and comprises plastic bristles or teeth. Such applicators give the user satisfactory results. However, she is always looking for new or better make-up effects. For example, the user sometimes wants a "natural" make-up effect in which the separation of the eyelashes does not have an appearance that is too regular.

SUMMARY OF THE INVENTION

An object of the invention is therefore to improve the cosmetic product applicators.

The invention therefore relates to an applicator for a cosmetic product, having a proximal end and a free end, and comprising at least two rows of fingers forming a first and a second planar layer respectively, the two layers being separate and parallel to one another,
one dimension of the fingers decreasing along the applicator from the proximal end to the free end.

The finger dimension which decreases may be its largest dimension but also another dimension. For example, it may be its length, its width and/or its thickness.

If it is the length, a "fern" shaped profile is obtained. Such an arrangement is especially advantageous since it makes it easier to insert the applicator into a cosmetic product container. If it is the thickness, this allows in particular the eyelashes to be separated and made up differently over the entire length of a row of eyelashes. In both cases, parts of the applicator with different configurations are created and can be used for different make-up movements or results.

In addition, due to this decrease in the dimension of the fingers, the free end can be particularly narrow. Thus, this end can be used either to deposit product precisely, for example if touching-up, or for another make-up function, for example as eyeliner. This is particularly advantageous for the user since she no longer needs to buy two different articles, for example a mascara applicator and an eyeliner.

A row of fingers corresponds to fingers arranged in an organized manner linearly.

Advantageously, an angle between a longitudinal direction of the applicator and each finger decreases along the applicator from the proximal end to the free end.

This characteristic also helps to give the applicator a fern shape or a tapered profile. As already mentioned, this characteristic makes it easier to insert the applicator into the container. For example, the angle between the longitudinal direction of the applicator and the most distal finger could be close to 0° or even equal to 0°. Furthermore, the angle between the longitudinal direction of the applicator and the most proximal finger could also be substantially equal to 90°. Generally, it is provided that the angle between any finger of the applicator and the longitudinal direction of the applicator is between 0° and 90°, preferably between 0° and 75°, for example between 0° and 60° or even between 0° and 45°.

Advantageously, the two rows are facing each other, these two rows preferably being adjacent.

Thus, a space is formed between these two rows and can act as product reserve. This limits the number of times that the user needs to reinsert the applicator into the container during use. Furthermore, if these two rows are adjacent, this reserve is locally compressed by the two rows when applying the product on the eyelashes. Thus, the product only comes out of this reserve in the area required for the make-up, which optimizes the product reserve and further reduces the number of times that the user needs to reinsert the applicator into the container.

Preferably, the applicator further comprises a third row of fingers extending into the first layer.

More preferably, the applicator further comprises a fourth row of fingers extending into the second layer, preferably the fourth row being facing the third row.

The advantages of the arrangement of the third and fourth rows being facing each other are the same as those described previously for the first and second rows. The special arrangements of the third and fourth rows compared with the first and second rows give the applicator a generally flat shape that is particularly advantageous since it limits the dimensions of the applicator and therefore reduce the size of the article containing it.

Advantageously, at least some of the fingers of two of the rows extending into a given layer have respective opposite directions.

Preferably, the respective fingers of two of the rows facing each other are offset relative to one another along a longitudinal direction of the applicator, and are preferably staggered.

This particular arrangement increases the number of eyelashes that will be made up and/or combed by the applicator and therefore improves the make-up result. The value of the offset between two consecutive fingers could be variable along the applicator. Thus, an irregular arrangement of the fingers is obtained along the applicator. Such a distribution of the fingers is particularly interesting since a "ruffled" effect of the eyelashes is obtained, thereby giving the impression of being thicker and longer. Furthermore, the staggered arrangement makes it possible to create product reserves between the fingers, this characteristic being advantageous since the user does not have to insert the applicator into the container too many times.

Preferably, in at least one of the rows, every finger of the row has at least a direction, a dimension and/or a shape that is different from the others.

Thus, it is possible to obtain different make-up results and effects depending on the portion of the applicator in contact with the eyelashes.

Furthermore, in some cases this allows an applicator with an irregular appearance to be obtained. This characteristic also helps to produce the required irregular or "ruffled" make-up effect. For example, every finger could have a direction, a dimension and a shape that is different from the others.

Advantageously, since the fingers are main fingers, the applicator further comprises secondary fingers extending from at least one of the main fingers, preferably secondary fingers extend from each main finger.

Thus, the combing effect of the applicator is improved. For example, a main finger could carry on its surface between two and twenty secondary fingers, preferably between two and ten secondary fingers, or even between two and six secondary fingers.

Preferably, at least one of the secondary fingers extends into the same layer as the main finger from which it extends, preferably all the secondary fingers of a main finger extend into the same layer as the main finger.

Thus, a thinner applicator is obtained since the main and secondary fingers extend into the same layer. The applicator is therefore smaller and can form an applicator of smaller dimensions, which is particularly advantageous for the user who very often needs to carry the article, for example in a handbag. Frequently in fact, the user keeps with her several articles of this type, which she uses depending on the circumstances.

Advantageously, at least one of the main fingers has an upper face and a lower face, and at least one of the secondary fingers associated with this main finger extends from one of these faces.

Thus, an assembly consisting of a main finger and the associated secondary fingers is used to make up the eyelashes in several different directions, thereby helping to produce the irregular effect and ruffled result of the make-up. Furthermore, due to this multi-directional nature of the fingers, an eyelash can be caught irrespective of its position in the row of eyelashes. The upper and lower faces of a main finger could carry the same number of secondary fingers. For example, each one can carry between 1 and 10 secondary fingers, or even between 1 and 5 secondary fingers. The upper and lower faces could also carry a different number of secondary fingers. For example, the upper face could carry one secondary finger and the lower face could carry two secondary fingers, or vice versa.

Advantageously, at least one of the main fingers and/or at least one of the secondary fingers has a flat cross-section in a direction parallel to a longitudinal direction of the applicator.

This flat cross-section provides the advantage of creating a "plateau" which can be coated with product after the applicator has been inserted into a product container. Thus, the finger carries on its surface a large amount of product available for the make-up, which reduces the number of times that the user needs to reinsert the applicator into the container. Furthermore, this flat, and therefore thin, cross-section separates the eyelashes from one another efficiently, which produces the make-up effect required by the user.

Preferably, at least one of the main fingers and/or at least one of the secondary fingers has a generally flat shape, preferably all the main fingers and/or all the secondary fingers having a generally flat shape.

The advantages of this characteristic are the same as those mentioned previously, i.e. a reduced size, better product reserve and improved separation of the eyelashes.

Preferably, at least one of the fingers has a lanceolate shape.

A lanceolate shape means a general shape of a lance. A finger of this shape has a thin base which increases considerably over a short portion then progressively narrows to its free end which is thin and flexible. Thus, the wide base portion can act as product reserve while the thin free end can be used to smooth the product on the eyelash and to separate the eyelashes so as to obtain a better make-up result. This thin free end also makes it easier to insert the applicator into a case of the article. It also simplifies the make-up of small eyelashes and corrections during make-up. All the main fingers may have a lanceolate shape. All the secondary fingers may also have a lanceolate shape. Other finger shapes can be considered, for example falcate, oblanceolate, subulate, acicular, acuminate, rhomboid or water drop-shaped.

Advantageously, at least one of the fingers has grooves on its surface, preferably all the fingers having grooves on their surfaces.

These grooves increase the friction on the surface of the fingers and therefore load the applicator with more product when it is inserted into the reserve. The grooves increase the area of each finger in contact with the product and the adhesion of the product on the finger. This therefore reduces the number of times that the user needs to reinsert the applicator into the container. The dimensions and directions of these grooves may vary between the different fingers depending on the amount of product to be loaded on the applicator.

Preferably, the applicator has a generally wavy shape.

Due to this wavy shape, the product can be applied and the eyelashes combed differently depending on their positions relative to the applicator. Once again, this helps to produce an irregular and ruffled make-up result. The applicator could have a single wave with a concave portion and a convex portion. It could also have a more complex wave with for example two concave portions and two convex portions.

Preferably, the applicator is made in one piece.

The advantage of a one-piece applicator is that it is faster and possibly cheaper to manufacture. The applicator may be made of a single material or of several different materials.

The applicator could be made without a core.

Such an applicator is preferably manufactured by additive synthesis.

The invention also provides for a cosmetic article comprising an applicator as described previously.

Preferably, the article comprises a wiper, the thickness and rigidity of at least one of the secondary fingers being such that when the applicator passes through the wiper, the wiper does not deform the finger.

Thus, the loading of these secondary fingers with product is optimum when they leave the container. Since these fingers are not deformed, or deformed only slightly, when passing through the wiper, they remain loaded with a large amount of product afterwards. The main fingers could have a base and a free end, at least some of the secondary fingers adjacent to the base of the main finger to which they are associated could have the thickness and rigidity properties mentioned above. Thus, when the applicator passes through the wiper, the product present on these secondary fingers, i.e. present in a central portion of the applicator, is not wiped. This non-wiped product thus represents a reserve for the application.

Preferably, the article comprises a wiper, the thickness and rigidity of at least one of the secondary fingers being such that when the applicator passes through the wiper, the wiper deforms the finger.

Thus, these secondary fingers are loaded with less product, their role being more to comb and separate the eyelashes. When the applicator passes through the wiper, these fingers are substantially deformed and a large part of the product they carried is wiped off. The main fingers could have a base and a free end, at least some of the secondary fingers adjacent to the free end of the main finger to which they are associated could have the thickness and rigidity properties mentioned above. This is particularly useful since these fingers in contact with the eyelashes will be able to comb them and separate them more easily.

The invention also provides for a method of manufacturing by additive synthesis an applicator as described previously, comprising the following steps of:
obtaining data concerning the applicator; and
additive synthesis of the applicator using the data.

The advantage of this type of manufacture is, in particular, that it can be used to produce applicators of complex structure, which it would be difficult or even impossible to produce by injection, considering in particular the existence of some parts with undercut.

Various additive synthesis methods known by those skilled in the art can be used to manufacture the invention. They include, for example, selective laser sintering (SLS) and stereolithography (SLA). An example of a method of manufacturing a cosmetic product applicator by additive synthesis is described in application WO 2008/113939 in the name of the applicant.

The invention also provides for a computer file comprising data that can be used by a computer program to control the implementation of the method as described previously.

The invention also provides for an electronic storage medium comprising stored data to implement the method as described previously.

Lastly, the invention also provides for a method of providing a file as described previously on a telecommunication network in order to download it.

BRIEF DESCRIPTION OF THE DRAWINGS

We will now describe one embodiment of the invention given as a non-limiting example in reference to the drawings, in which.

DETAILED DESCRIPTION OF THE INVENTION

We will now describe an embodiment of the applicator and of the method according to the invention, in reference to FIGS. 1 to 6. We will describe here a mascara applicator but, obviously, the applicator according to invention could be used with another cosmetic product, for example nail varnish, lipstick or gloss.

The mascara applicator 1 described in this embodiment is part of a cosmetic article 2 comprising a cap or plug 3, to which the applicator 1 is rigidly attached, and a case 4 comprising a mascara container 5 and a wiper 6 (see FIG. 1) housed in the collar of the container on which the cap can be removably attached, for example screwed, to close the container of the article. The applicator thus extends in the container and is immersed in the mascara.

Obviously, other types of article with mascara applicators can be considered such as for example "pen" type articles in which the applicator is not connected to a cap or articles in which the applicator is not immersed in the mascara reserve when not used.

Figure 1:
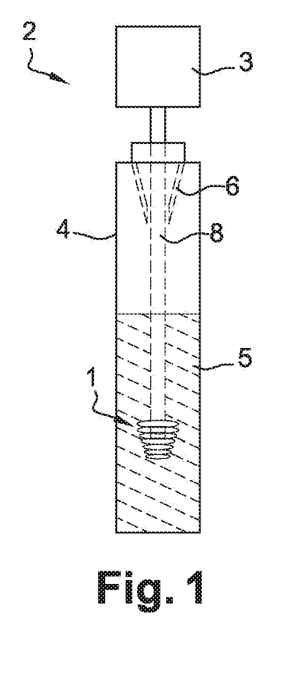
FIG. 1 is a schematic longitudinal cross-section of a cosmetic article according to one embodiment of the invention.
Figure 2A:
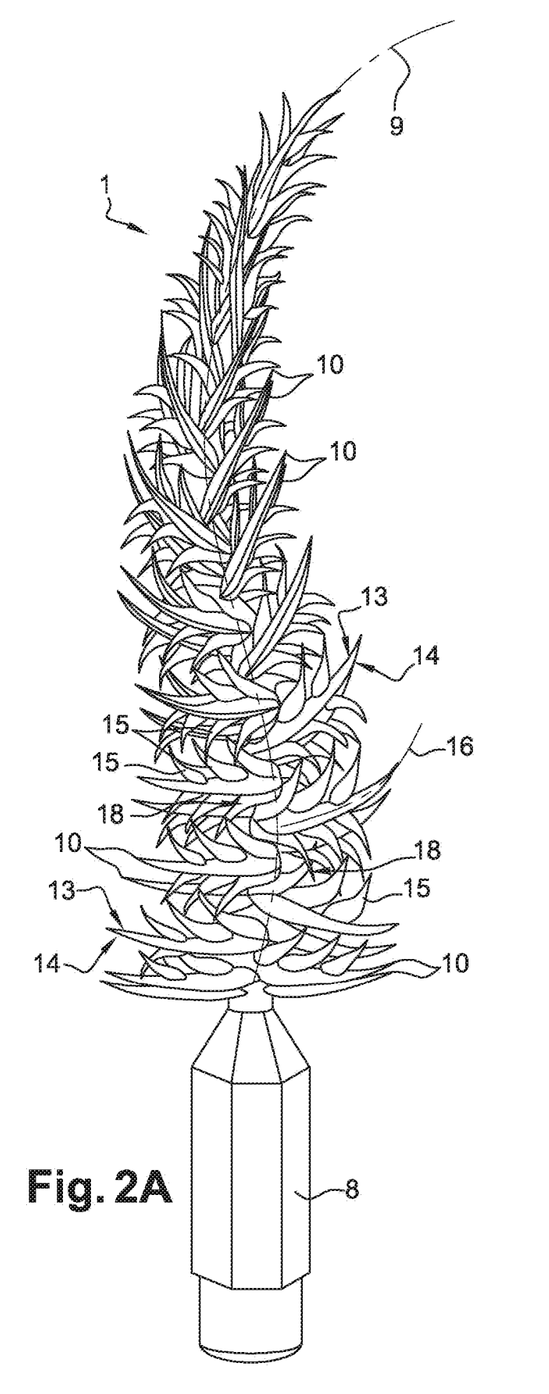
FIG. 2A is a front view of the applicator of the article of FIG. 1.
Figure 2B:
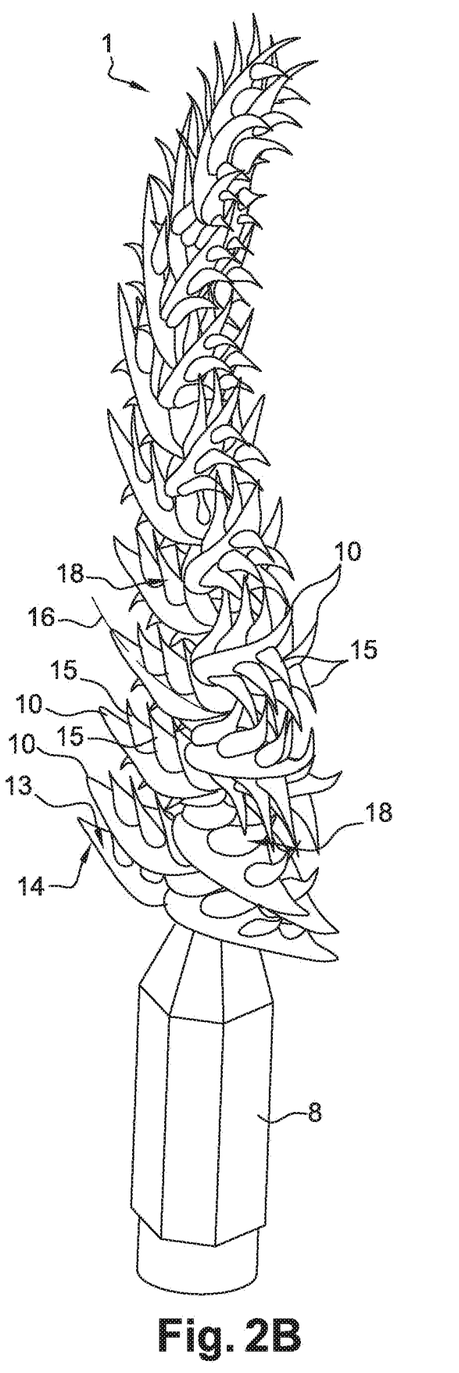
FIGS. 2B and 2C are perspective views of the applicator of FIG. 2.
Figure 2C:
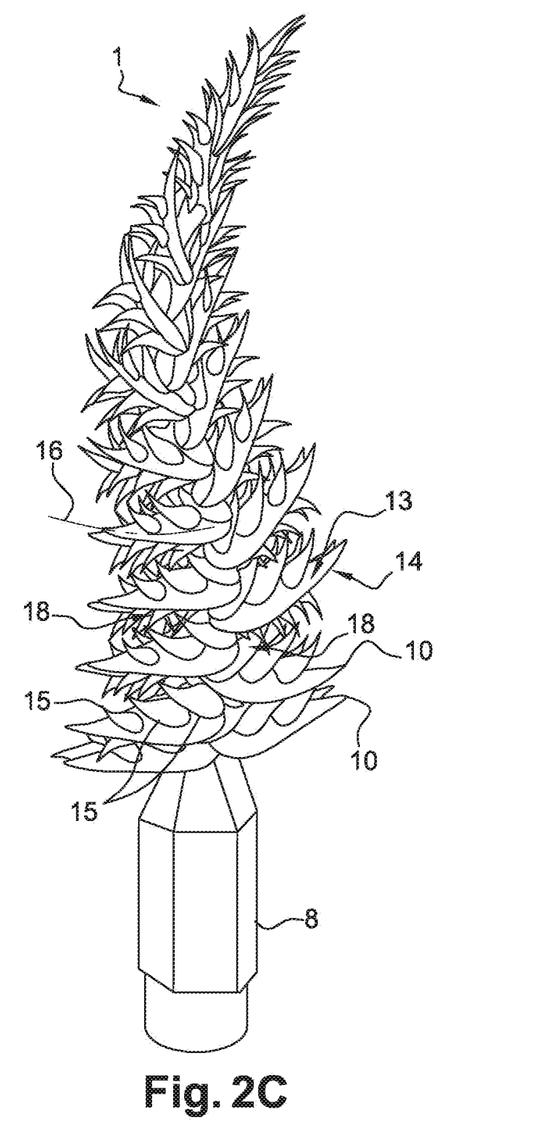
Figure 3:
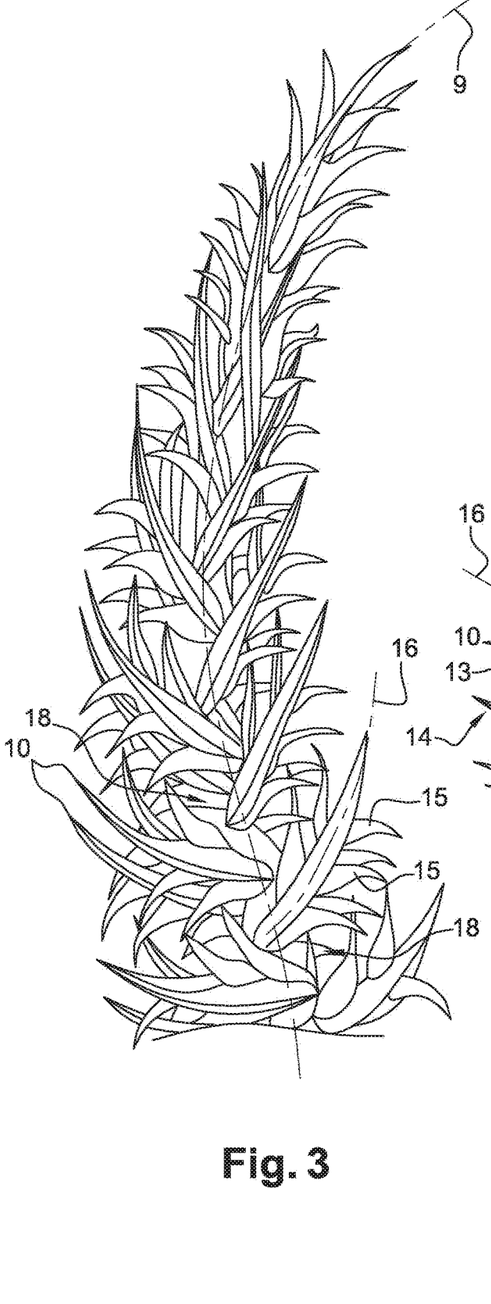
FIGS. 3 and 4 are partial enlarged front views respectively of the free end and of the base of the applicator of FIGS. 2A to 2C.
Figure 4:
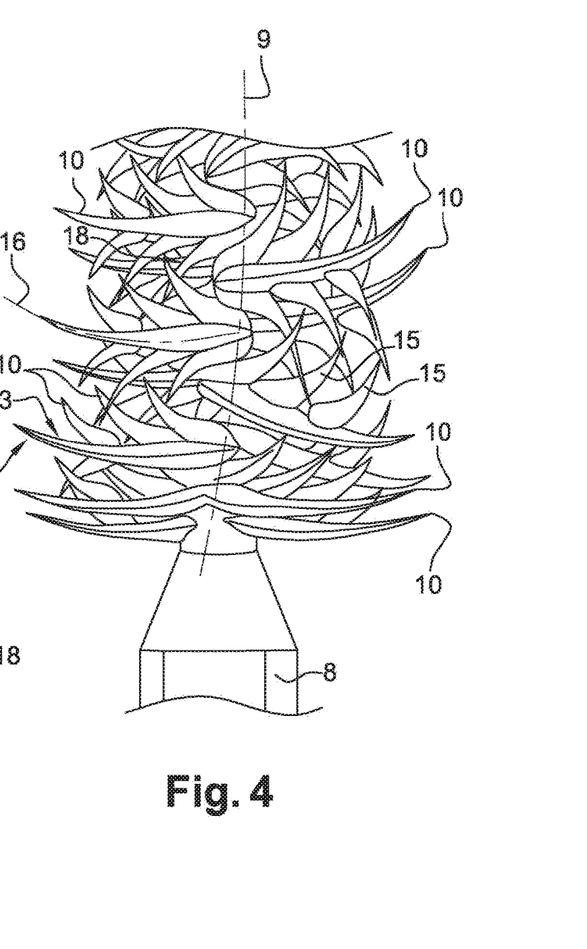
Figure 5:
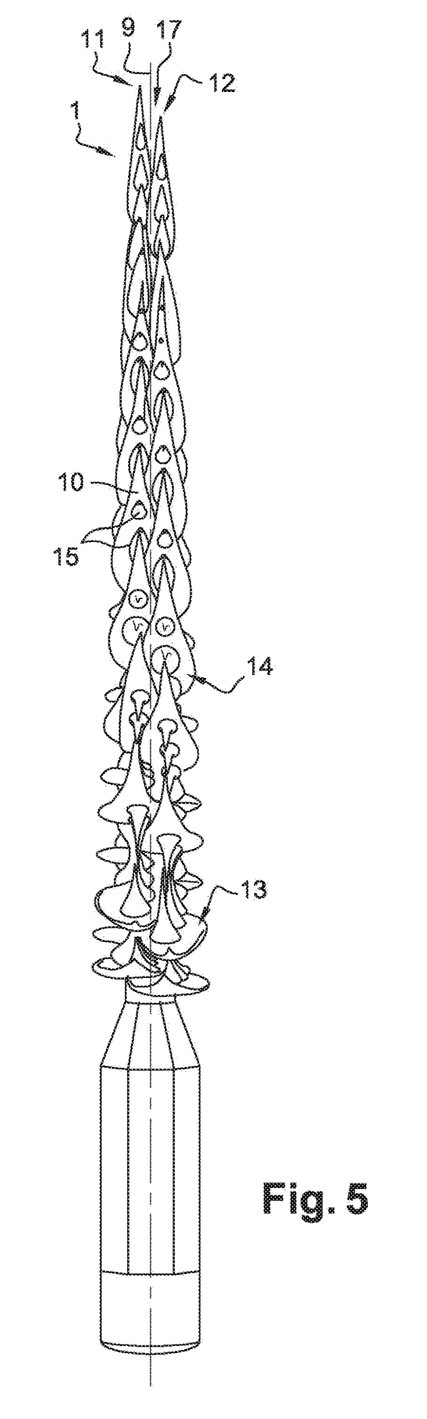
FIGS. 5 and 6 are respectively side and end views of the applicator of FIGS. 2A to 2C.
Figure 6:
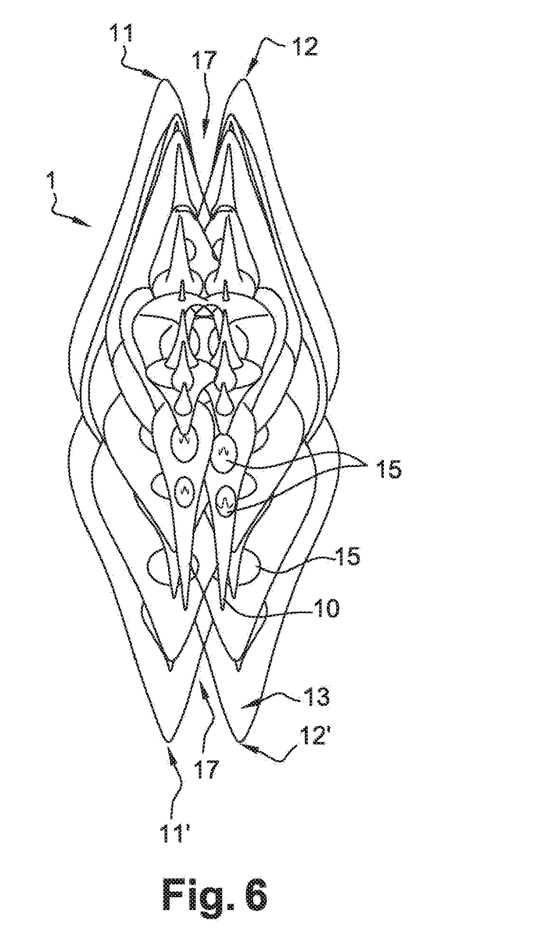

The applicator is carried by a straight rod 8 which connects it to the cap 3. The applicator has a generally elongate and wavy flat shape along its longitudinal axis 9. The rod 8 has a generally straight cylindrical shape. The rod and the applicator are connected together by one of their ends.

The applicator could have other general shapes, for example a generally non-flat circular shape, even spherical, parallelepiped, cubic or water drop-shaped.

The Applicator

The applicator 1 comprises in this case four rows of main fingers 10, each finger being carried directly at its base by the middle fiber of the applicator. Each row extends from the base or proximal end of the applicator towards its free end. Two of these rows 11, 11' are located in the same layer and two other rows 12, 12' are located in another same layer (see FIGS. 5 and 6). The two layers are separate, parallel to one another and non-coplanar. These two layers are adjacent and the space 17 between them is adapted to hold mascara reserves. The rows 11, 12 are adjacent and facing each other. The same applies for the rows 11' and 12'. The applicator could comprise a larger or smaller number of rows of fingers, for example two, three, five, six, seven or eight rows of fingers. For example, if there were six rows of fingers, there could be three layers each comprising two rows of fingers, these three layers being separate, parallel to one another and non-coplanar.

In the present case, each row 11, 11', 12, 12' comprises between nine and eleven main fingers 10. A number of main fingers 10 of between three and forty could be considered, even between ten and thirty, for example between fifteen and twenty-five.

In a given layer, the fingers of the two rows follow one another alternately along the entire length of the applicator. Obviously, this does not have to be the case and, for example, the main fingers 10 of the two rows 11, 12, could follow one another two at a time, i.e. on crossing the layer from the proximal end of the applicator towards its free end, we find successively two main fingers 10 of a first row 11, 12 and two main fingers of a second row 11, 12 (see FIGS. 2A to 2C). There could also be no particular organization for the succession of the fingers of the two rows.

The arrangement described above implies the formation of a space 18 (see FIGS. 2A to 2C) between two successive fingers of a given row, this space being able to contain mascara and therefore act as mascara reserve.

The main fingers 10 have a generally lanceolate shape of flat cross-section in a plane perpendicular to a general direction of the finger or along a direction radial to the axis. At least one of the main fingers 10 could have a generally flat shape. Their lanceolate shape implies that they have a wide base portion and a thin free end. The main fingers 10 could have other shapes useful for producing a special make-up effect. In the present case, all the main fingers 10 have the same general shape. An applicator 1 having some main fingers 10 with the shape described above and other main fingers with other shapes could be considered.

The main fingers 10 each have two faces (see FIG. 4), an upper face 13 which in this case is facing the free end of the applicator, and a lower face 14 which in this case is facing the proximal end of the applicator. Each of these faces has grooves on the surface in order to carry mascara more easily when the applicator is removed from the container. Most of the main fingers have a non-planar, and in this case curved, shape. This curvature of the main fingers is slightly concave with a centre of curvature facing the upper face 13 of finger 10. The centre of curvature could be facing the lower face 14 of the finger 10. This curvature is used to comb the eyelash in a required specific direction without the user having to make a particular make-up movement.

The width and length of the main fingers 10 decrease along the applicator 1 from its proximal end towards its free end. Inversely, the width and/or length of the main fingers 10 could decrease along the applicator 1 in the opposite direction. Obviously, the width of the main fingers 10 could remain the same along the applicator 1 from its proximal end towards its free end. The dimensions of the fingers could decrease and increase progressively along the applicator or in intervals or "in steps".

The main fingers 10 each have a general direction which forms an angle with a longitudinal direction 9 of the applicator 1. This angle decreases along the applicator from the proximal end towards the free end. In the present case, the angle between the longitudinal direction 9 of the applicator and the most distal finger, i.e. near the free end of the applicator, is close to 0°. The angle between the longitudinal direction of the applicator and the most proximal finger, i.e. near the base, is substantially equal to 90°. Between this most proximal main finger 10 and the most distal main finger, the angle between the successive main fingers 10 and the longitudinal direction 9 decreases progressively. Alternately, this angle could increase progressively.

There could be no progressive change in the angle between the various main fingers and the longitudinal direction 9. For example, along the applicator from its proximal end towards its free end, a main finger 10 may form with the longitudinal direction 9 a smaller angle than that formed by the previous main finger and also smaller than that formed by the next main finger. A finger could also form a larger angle with the longitudinal direction 9 than that formed by the previous and next main fingers. In these two cases, we obtain an applicator with a highly irregular appearance which may be required.

The angle between any main finger of the applicator and the longitudinal direction of the applicator could be between 0° and 90°, preferably between 0° and 75°, for example between 0° and 60°, or even between 0° and 45°.

Secondary fingers 15 extend in this case from at least one of the faces of each of the main fingers 10. For some main fingers 10, secondary fingers 15 extend from their upper 13 and lower 14 faces. For other main fingers, secondary fingers extend only from one of the two faces. For some main fingers 10, the same number of secondary fingers 15 extend from each face. In the present case, more of the main fingers 10 have three secondary fingers on each of their faces 13, 14.

The secondary fingers 15 have the same shape as the main fingers. Of course, at least some of the secondary fingers could have different shapes.

The secondary fingers 15 form an angle, relative to a longitudinal direction 16 of the main finger from which they extend, which is between 0° and 90°. Preferably, this angle is between 0° and 60°, or even between 0° and 45°. In the present case, the secondary fingers 15 which extend from the same main finger all form substantially the same angle with the longitudinal direction 16 of the main finger. Obviously, these angles could be different for the various secondary fingers 15.

The secondary fingers 15 also have upper and lower faces and grooves on their surfaces.

The secondary fingers 15 located on a given main finger 10 vary. Thus, the dimensions of the secondary fingers 15 decrease along the main finger 10 from its base towards its free end. It is the length and width of the secondary fingers which decrease. The various secondary fingers 15 located on a given main finger could all be identical. Also, the dimensions of the secondary fingers could not decrease but increase instead.

Generally, the dimensions of the secondary fingers decrease along the applicator from its proximal end towards its free end.

The secondary fingers 15 extend into the same layer as that into which their associated main finger 10 extends.

In this example, we see that each main finger 10, with its secondary fingers 15, has a general appearance similar to that of the entire applicator at smaller scale. The same applies for each secondary finger with respect to the main finger carrying it. The applicator structure therefore suggests that of a fractal. Note that this type of structure is characterized by an internal homothety and concerns objects whose structure is invariant on changing scale.

The thickness and rigidity of the secondary fingers 15 of a main finger 10 which are adjacent to the base of this main finger 10 are such that when the applicator 1 passes through the wiper 6, the wiper does not deform the secondary fingers.

Furthermore, the thickness and rigidity of the secondary fingers 15 of a main finger 10 which are adjacent to the free end of the main finger 10 are such that when the applicator 1 passes through the wiper 6, the wiper deforms the secondary fingers.

These two characteristics related to the rigidity and thickness of the secondary fingers can be taken alone or in combination.

Using the Applicator

Initially, the user handles the applicator 1, holding the cap 3 between her fingers and inserts the applicator 1 into the mascara container 5 of the article 2. During this step, the main 10 and secondary 15 fingers as well as the spaces 17 and 18 are loaded with mascara.

When the applicator 1 is removed from the container and therefore as it passes through the wiper 6, the applicator is wiped but all or some of the mascara reserve present in the spaces 17, 18, as well as that present on the secondary fingers 15 adjacent to the base of the main finger 10 to which they are attached, is kept. This is due in particular to the rigidity characteristic of these secondary fingers 15.

During use, the user brings the applicator up to her eyelashes in order to apply the make-up, using a traditional make-up movement, mostly vertical. The mascara present on the main 10 and secondary 15 fingers is thus deposited on the eyelashes. In the same movement, these fingers smooth the mascara deposited and comb the eyelashes. Since each finger, whether main or secondary, has different dimension and/or direction characteristics, the eyelashes are combed in different directions, which helps achieve the required ruffled effect.

During application, the mascara reserve present in the spaces 17, 18 spreads progressively over the upper and lower faces of the main and secondary fingers in order to limit the number of times that the user needs to insert the applicator into the mascara container 5 of the article 2.

Furthermore, due to the flexibility of the applicator, it is locally compressed at the areas of contact with the eyelashes, i.e. in the areas where the mascara is applied, which draws out the mascara present in the spaces 17, 18 and located in these areas. This simplifies the make-up by reducing the number of times that the user needs to reinsert the applicator into the container.

More precisely, when the applicator is locally compressed, the mascara present in the spaces 17, 18 located here comes out of these spaces and spreads over the main 10 and secondary 15 fingers and is therefore available for make-up.

Furthermore, the user can choose to use this applicator 1 as an eyeliner applicator. To do this, she uses the thin free end of the applicator to carefully deposit mascara on her skin, for example the skin of the top eyelid. In a non-limiting way, the user can incline the free end of the applicator relative to the eyelid in order to choose the thickness of the line she wants to apply, for example a thicker line to increase the make-up effect or a thinner line to obtain a more discreet make-up effect. The mascara present in the spaces 17, 18 can flow up to the free end of the applicator and therefore act as a reserve for it.

The Manufacturing Method

The applicator described above is manufactured in one piece. More particularly, this applicator is manufactured in this case by additive synthesis, also known as 3D printing.

Any suitable material can be used to manufacture the applicator. It may be a plastic, for example a polyamide, in particular a polyamide 1102, a PEBA 2301, or an ABS type resin, or a powdered metal such as a stainless steel or titanium.

The material may be rigid but will preferably be elastically flexible. Preferably, the material, in combination with the applicator's shape characteristics, gives the applicator a certain degree of flexibility.

Note that the length of a mascara applicator is generally less than 20 mm.

Several additive synthesis methods may be used to manufacture an applicator as described previously. We may mention in particular selective laser sintering from powdered material, and stereolithography (SLA). In the present case, a selective laser sintering method is used, this method offering the advantage of allowing objects of complex shape to be manufactured.

The applicator is first designed using computer-aided design (CAD) software. A file in STL format with the applicator design data is therefore created and then exported. This data determines the shape of the applicator. Other standard file formats for additive synthesis may be used.

This file is then processed by software supplied by the manufacturer of the machine used to carry out the additive synthesis. This software breaks down the file into sections in the form of about hundred digital images in SLI or BFF format, each image corresponding to a layer of the model to be printed, i.e. to a section of the applicator taken in a plane perpendicular to the direction 9. This data is then sent to the printer to produce the applicator.

Once the synthesis is finished, treatments may be applied to the applicator, for example to improve its appearance.

Obviously, numerous modifications can be made without leaving the scope of the invention.

The embodiment described above concerns mascara applicators and eyeliners, but these characteristics can be applied to other types of cosmetic product applicator such as applicators of nail polish, lipstick or cosmetic product for the eyebrows or the hair.

The invention claimed is:

1. An applicator for a cosmetic product having a proximal end and a free end, and comprising at least two rows of fingers forming a first and a second planar layer respectively,
    the first and second planar layers being separate and parallel to one another,
    one dimension of the fingers decreasing along the applicator from the proximal end to the free end, the two rows facing each other, these two rows being adjacent;
    wherein an angle between a longitudinal direction of the applicator and each finger decreases along the applicator from the proximal end to the free end,
    wherein the respective fingers of two of the rows facing each other are offset relative to one another along a longitudinal direction of the applicator, and
    wherein a value of the offset between two consecutive fingers is variable along the applicator;
    the fingers being main fingers and having a curved lanceolate shape, the applicator further comprises a plurality of secondary fingers each having a curved lanceolate shape and extending from at least one of the main fingers, each secondary finger has a base and the bases of two of the plurality of secondary fingers are spaced apart along the at least one of the main fingers.

2. The applicator according to claim 1, further comprising a third row of fingers extending into the first layer.

3. The applicator according to claim 1, further comprising a fourth row of fingers extending into the second layer, the fourth row facing the third row.

4. The applicator according to claim 1, wherein at least some of the fingers of two of the rows extending into a given layer have respective opposite directions.

5. The applicator according to claim 1, wherein the respective fingers of two of the rows facing each other which are offset relative to one another along the longitudinal direction of the applicator are staggered.

6. The applicator according to claim 1, wherein in at least one of the rows, every finger of that row has at least a direction, a dimension and/or a shape that is different from each other finger of that same row.

7. The applicator according to claim 1, wherein, the fingers being main fingers, the applicator further comprises secondary fingers extending from at least one of the main fingers, the secondary fingers extend from each main finger.

8. The applicator according to claim 7, wherein at least one of the main fingers has an upper face and a lower face, and at least one of the secondary fingers associated with this main finger extends from one of these faces.

9. The applicator according to claim 7, wherein at least one of the secondary fingers extends into the same layer as the main finger from which it extends.

10. The applicator according to claim 1, wherein at least one of the fingers and/or at least one secondary finger has a flat cross-section in a direction parallel to a longitudinal direction of the applicator.

11. The applicator according to claim 1, wherein at least one of the fingers and/or at least one secondary finger has a generally flat shape.

12. The applicator according to claim 1, wherein at least one of the fingers has a lanceolate shape.

13. The applicator according to claim 1, wherein at least one of the fingers has grooves on its surface.

14. The applicator according to claim 1, which has a generally wavy shape.

15. The applicator according to claim 1, wherein the applicator is one piece.

16. A cosmetic article comprising an applicator according to claim 1 and a cosmetic product container.

17. The article according to claim 16 wherein, the fingers are main fingers, the applicator further comprises secondary fingers extending from at least one of the main fingers, the secondary fingers extend from each main finger and, wherein the article comprises a wiper, the thickness and rigidity of at least one of the secondary fingers being such that when the applicator passes through the wiper, the wiper does not deform the secondary fingers.

18. The article according to claim 16 and wherein at least one of the main fingers has an upper face and a lower face, and at least one of the secondary fingers associated with this main finger extends from one of these faces and, wherein the article comprises a wiper, the thickness and rigidity of at least one of the secondary fingers being such that when the applicator passes through the wiper, the wiper deforms the secondary fingers.

\* \* \* \* \*